(12) United States Patent
Motoji et al.

(10) Patent No.: US 12,493,148 B2
(45) Date of Patent: Dec. 9, 2025

(54) OPTICAL INTEGRATED CIRCUIT

(71) Applicant: KYOCERA Corporation, Kyoto (JP)

(72) Inventors: Reona Motoji, Tokyo (JP); Tomoya Sugita, Machida (JP); Dan Maeda, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 18/840,405

(22) PCT Filed: Oct. 17, 2023

(86) PCT No.: PCT/JP2023/037582
§ 371 (c)(1),
(2) Date: Feb. 5, 2025

(87) PCT Pub. No.: WO2025/083786
PCT Pub. Date: Apr. 24, 2025

(65) Prior Publication Data
US 2025/0180805 A1 Jun. 5, 2025

(51) Int. Cl.
*G02B 6/12* (2006.01)
*G02B 6/136* (2006.01)

(52) U.S. Cl.
CPC ............... *G02B 6/12004* (2013.01); *G02B 2006/12157* (2013.01); *G02B 6/136* (2013.01)

(58) Field of Classification Search
CPC .................................................. G02B 6/12
USPC .......................................................... 385/14
See application file for complete search history.

(56) References Cited

U.S. PATENT DOCUMENTS

| 5,598,492 | A | * | 1/1997 | Hammer | G02F 1/0955 372/50.12 |
| 7,664,346 | B2 | | 2/2010 | Mizumoto et al. | |
| 10,877,300 | B2 | | 12/2020 | Coolbaugh et al. | |
| 11,550,173 | B2 | | 1/2023 | Coolbaugh et al. | |
| 11,982,888 | B2 | * | 5/2024 | Motoji | G02F 1/0955 |

(Continued)

FOREIGN PATENT DOCUMENTS

| EP | 2746839 A1 | 6/2014 |
| JP | H07-191281 A | 7/1995 |

(Continued)

OTHER PUBLICATIONS

Written Opinion of the International Searching Authority issued in PCT/JP2023/037582; mailed Dec. 26, 2023.

(Continued)

*Primary Examiner* — Kaveh C Kianni
(74) *Attorney, Agent, or Firm* — Procopio, Cory, Hargreaves & Savitch LLP

(57) ABSTRACT

An optical integrated circuit includes a substrate including a substrate surface, a first waveguide and a second waveguide configured to allow electromagnetic waves to propagate along the substrate surface, and a non-reciprocal member disposed on a side of the first waveguide and the second waveguide remote from the substrate surface. At least part of the non-reciprocal member is disposed in a range of a mode field diameter of TM mode electromagnetic waves in the first waveguide. The non-reciprocal member is not disposed in a range of a mode field diameter of TM mode electromagnetic waves in the second waveguide.

2 Claims, 3 Drawing Sheets

(56) References Cited

U.S. PATENT DOCUMENTS

| | | | |
|---|---|---|---|
| 2014/0247477 A1* | 9/2014 | Duan | G02F 1/0955 359/341.1 |
| 2017/0199402 A1* | 7/2017 | Sun | G02F 1/0955 |
| 2022/0236593 A1* | 7/2022 | Karinou | G02F 1/212 |
| 2024/0329439 A1* | 10/2024 | Pintus | G02F 1/095 |

FOREIGN PATENT DOCUMENTS

| | | |
|---|---|---|
| JP | 2021-021831 A | 2/2021 |
| JP | 2021-527839 A | 10/2021 |
| JP | 2022-182107 A | 12/2022 |
| WO | 2007083419 A1 | 7/2007 |

OTHER PUBLICATIONS

Zhuromskyy et al., "Analysis of Polarization Independent Mach-Zehnder-Type Integrated Optical Isolator", Journal of Lightwave Technology, vol. 17, No. 7, Jul. 1999, 0733-8724/99$10.00 © 1999 IEEE, 6 pages.

* cited by examiner

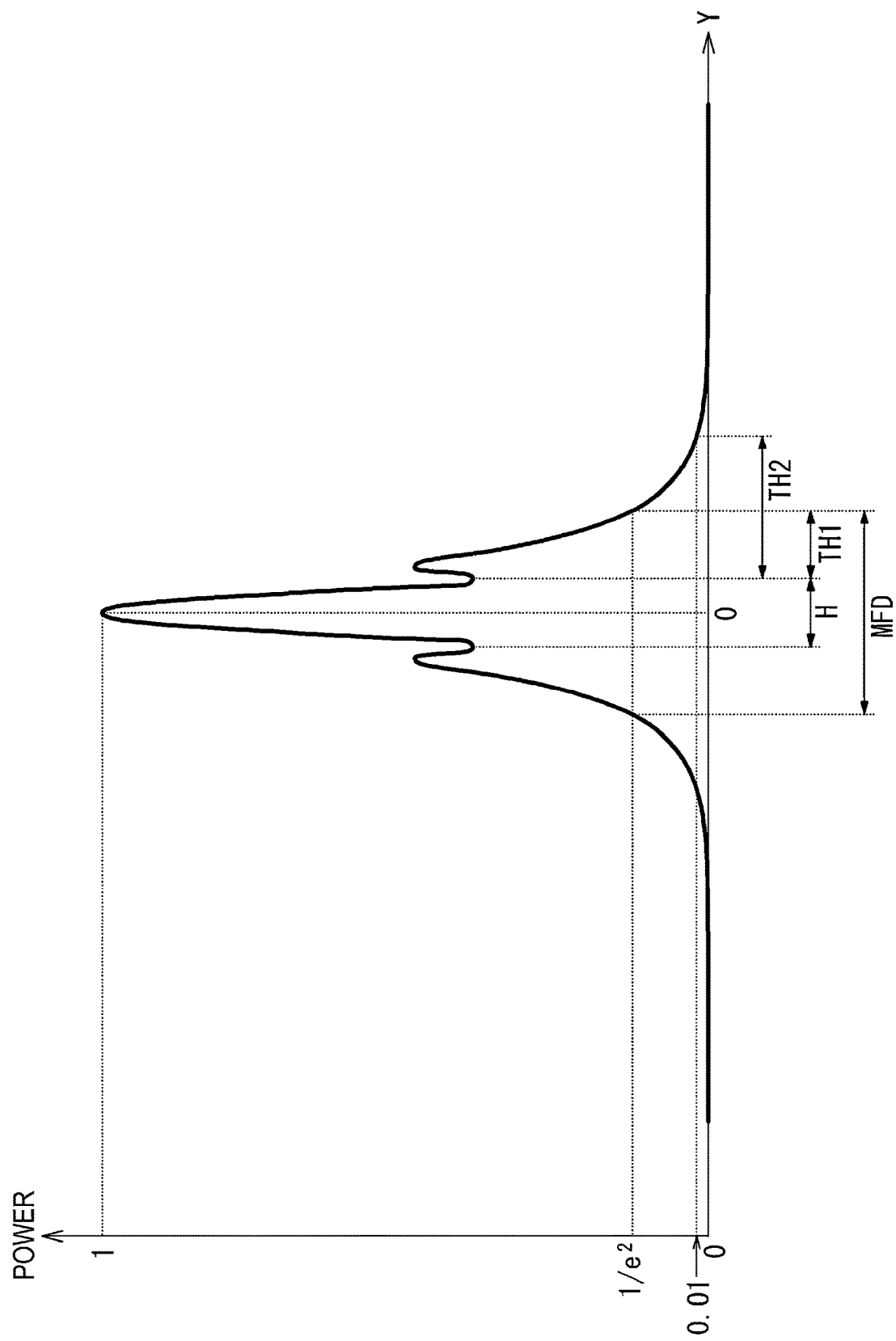

OPTICAL INTEGRATED CIRCUIT

TECHNICAL FIELD

The present disclosure relates to an optical integrated circuit.

BACKGROUND OF INVENTION

As described in Patent Literature 1, a known optical isolator includes a layer of magneto-optical material Ce: YIG as a waveguide layer.

CITATION LIST

Patent Literature

Patent Literature 1: International Publication No. 2007/083419

SUMMARY

In an embodiment of the present disclosure, an optical integrated circuit includes a substrate including a substrate surface, a first waveguide and a second waveguide configured to allow electromagnetic waves to propagate along the substrate surface, and a non-reciprocal member disposed on a side of the first waveguide and the second waveguide remote from the substrate surface. At least part of the non-reciprocal member is disposed in a range of a mode field diameter of TM mode electromagnetic waves in the first waveguide. The non-reciprocal member is not disposed in a range of a mode field diameter of TM mode electromagnetic waves in the second waveguide.

BRIEF DESCRIPTION OF THE DRAWINGS

FIG. 3 is a graph illustrating intensity at each point on a Y axis in the intensity distribution illustrated in FIG. 2.

DESCRIPTION OF EMBODIMENTS (Exemplary Configuration of Optical Integrated Circuit 1)

Figure 1:
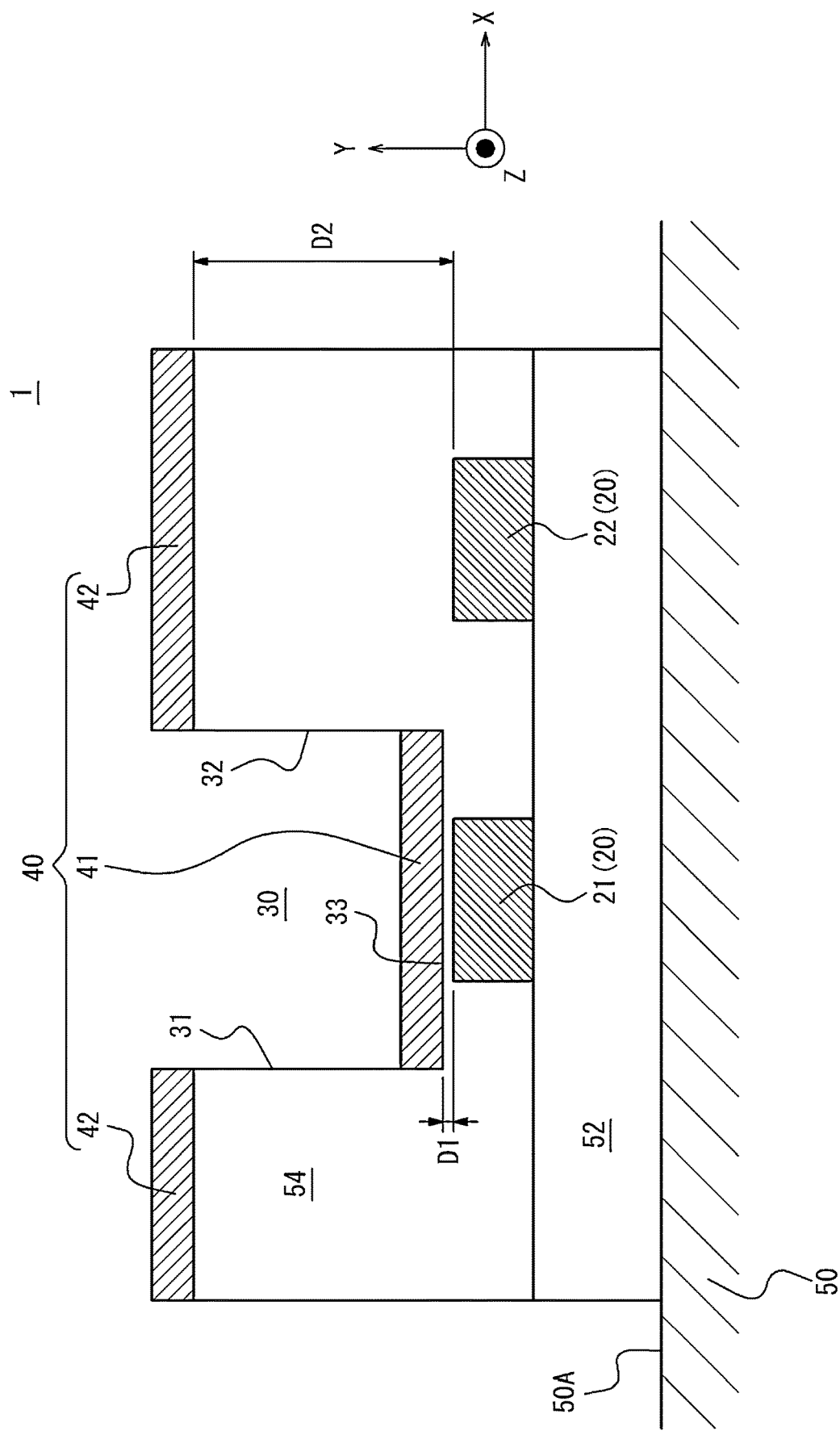
FIG. 1 is a cross-sectional diagram illustrating an exemplary configuration of an optical integrated circuit according to an embodiment.

As illustrated in FIG. 1, in an embodiment, an optical integrated circuit 1 includes a substrate 50, a BOX layer 52, an insulating layer 54, a waveguide 20, and a non-reciprocal member 40. The substrate 50 includes a substrate surface 50A. The BOX layer 52 is disposed on the substrate surface 50A. The waveguide 20 is disposed on the BOX layer 52. The waveguide 20 extends toward the back of the drawing, that is, along an Z axis direction. The insulating layer 54 is disposed on the BOX layer 52 and the waveguide 20. The non-reciprocal member 40 is disposed on the insulating layer 54.

The substrate 50 may contain a conductor, such as metal, a semiconductor, such as silicon, glass, or resin. Although the substrate 50 is made of silicon (Si) in the present embodiment, the material is not limited to this, and various other materials may be used.

The waveguide 20 is surrounded by the BOX layer 52 and the insulating layer 54. The waveguide 20 is also referred to as a core. The BOX layer 52 and the insulating layer 54 are also referred to as cladding. The core and the cladding may contain a dielectric material. The waveguide 20 is also referred to as a dielectric line. The waveguide 20 serving as a core is disposed along the substrate surface 50A and allows electromagnetic waves to propagate along the substrate surface 50A. In other words, in the waveguide 20 serving as a core, electromagnetic waves propagate in the direction in which the waveguide 20 extends.

The materials of the core and the cladding are determined such that the relative dielectric constant of the core is greater than the relative dielectric constant of the cladding. In other words, the materials of the core and the cladding are determined such that the refractive index of the cladding is smaller than the refractive index of the core. This can allow all electromagnetic waves propagating through the core to be reflected at the boundary with the cladding. As a result, a loss of electromagnetic waves propagating through the core can be reduced.

The relative dielectric constants of the core and the cladding may be greater than the relative dielectric constant of air. Making the relative dielectric constants of the core and the cladding greater than the relative dielectric constant of air can reduce leakage of electromagnetic waves from the optical integrated circuit 1. As a result, a loss caused by radiation of electromagnetic waves from the optical integrated circuit 1 to the outside can be reduced.

Although the material of the waveguide 20 serving as a core is silicon (Si) in the present embodiment, the material is not limited to this, and various other materials may be used. Although the material of the BOX layer 52 and the insulating layer 54 serving as cladding is quartz glass or a silicon oxide ($SiO_2$) film, the material is not limited to this, and various other materials may be used. The relative dielectric constants of silicon and quartz glass are about 12 and about 2, respectively. Silicon can allow low-loss propagation of electromagnetic waves having near-infrared wavelengths of about 1.2 μm to about 6 μm. When the waveguide 20 is made of silicon, the waveguide 20 can allow low-loss propagation of electromagnetic waves having a wavelength in the 1.3-μm band or 1.55-μm band used in optical communication.

The waveguide 20 includes a first waveguide 21 and a second waveguide 22. The first waveguide 21 and the second waveguide 22 are both disposed on the BOX layer 52. The insulating layer 54 includes a recess 30 defined by a side surface 31, a side surface 32, and a bottom surface 33. The recess 30 is disposed, with the bottom surface 33 extending along the first waveguide 21. The recess 30 may be formed, for example, by etching the insulating layer 54.

The non-reciprocal member 40 is formed by deposition over the substrate 50, with the recess 30 formed in the insulating layer 54. A part of the non-reciprocal member 40 deposited in the recess 30 corresponds to a first non-reciprocal member 41. A part of the non-reciprocal member 40 deposited outside the recess 30 corresponds to a second non-reciprocal member 42. That is, the non-reciprocal member 40 includes the first non-reciprocal member 41 and the second non-reciprocal member 42. The first non-reciprocal member 41 is disposed on the bottom surface 33 of the recess 30 in the insulating layer 54. The second non-reciprocal member 42 is disposed on a part of the insulating layer 54 outside the recess 30.

In the present embodiment, cerium-substituted yttrium iron garnet (Ce: YIG) is used as a material of the non-reciprocal member 40. A transparent magnetic material, such as a substance obtained by substituting a part of YIG, like bismuth-substituted YIG (Bi: YIG), may be used as a material of the non-reciprocal member 40. A ferromagnetic material, such as FeCo, FeNi, or CoPt, or a substance containing a ferromagnetic material, may be used as a material of the non-reciprocal member 40. A dielectric material which is a composite of magnetic nanoparticles, such as a nanogranular material, may be used as a material of the non-reciprocal member 40. The materials are not limited to those described above, and various other magnetic materials may be used as the non-reciprocal member 40.

D1 represents a distance between an upper surface of the first waveguide 21 and a lower surface of the first non-reciprocal member 41. D2 represents a distance between an upper surface of the second waveguide 22 and a lower surface of the second non-reciprocal member 42.

When an amplitude direction of an electrical field of electromagnetic waves propagating along the substrate surface 50A of the substrate 50 coincides with a direction normal to the substrate surface 50A, the electromagnetic waves are TM mode electromagnetic waves. When TM mode electromagnetic waves propagate in the Z axis direction in the waveguide 20 illustrated in FIG. 1, an amplitude direction of an electrical field of the TM mode electromagnetic waves coincides with a Y axis direction. On the other hand, when an amplitude direction of an electrical field of electromagnetic waves propagating along the substrate 50 is orthogonal to the propagation direction of the electromagnetic waves and coincides with a direction along the substrate surface 50A, the electromagnetic waves are TE mode electromagnetic waves. When TE mode electromagnetic waves propagate in the Z axis direction in the waveguide 20 illustrated in FIG. 1, an amplitude direction of an electrical field of the TE mode electromagnetic waves coincides with an X axis direction.

Figure 2:
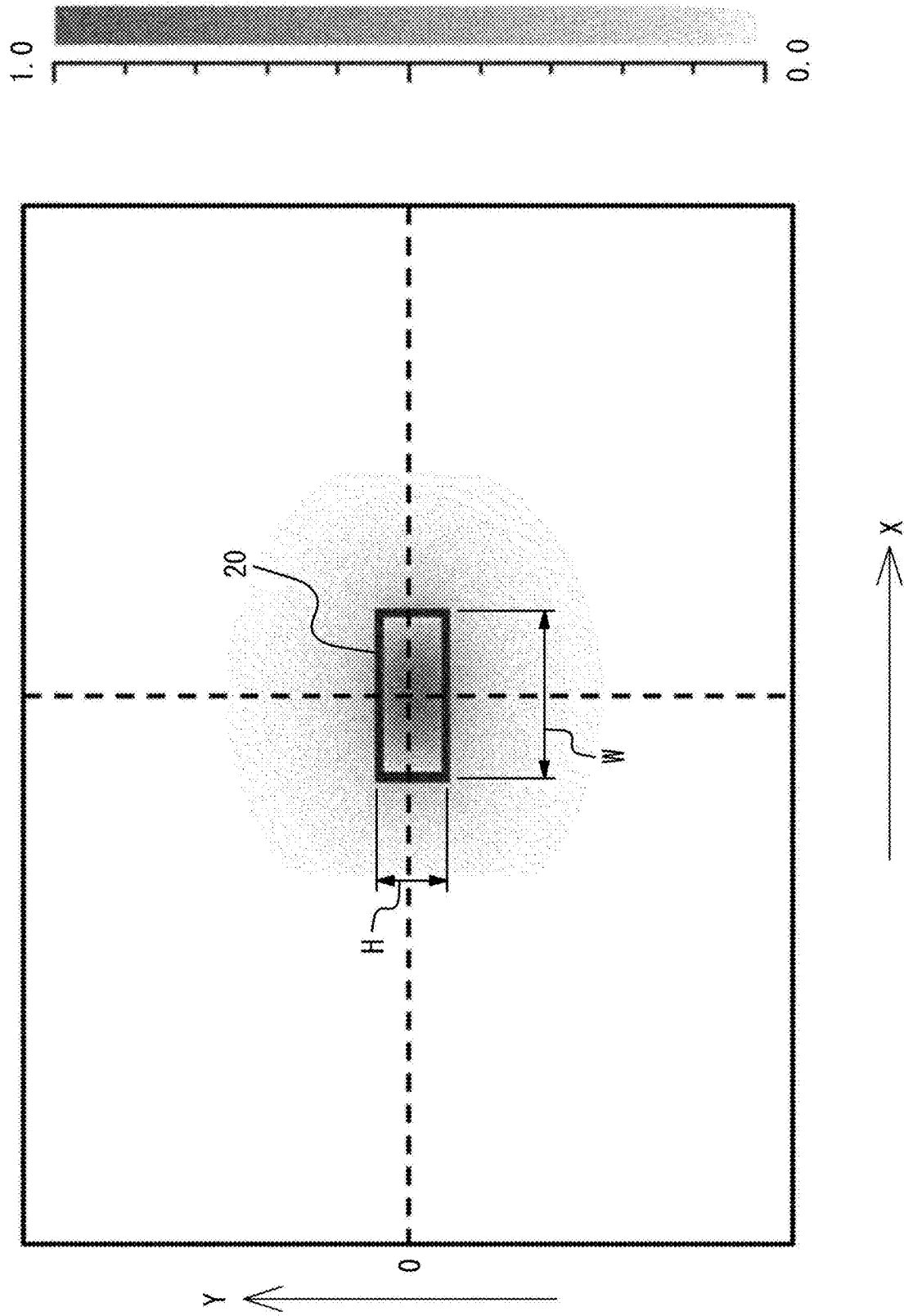
FIG. 2 is a diagram illustrating an exemplary intensity distribution of TM mode electromagnetic waves propagating through a waveguide.

Assume that TM mode electromagnetic waves propagate through the waveguide 20 illustrated in FIG. 1. FIG. 2 illustrates an intensity distribution of electromagnetic waves in a cross-section orthogonal to the propagation direction of TM mode electromagnetic waves propagating through the waveguide 20. A horizontal axis in FIG. 2 represents coordinates in the X axis direction, that is, in a direction along the substrate surface 50A in the cross-section orthogonal to the propagation direction of electromagnetic waves. A vertical axis in FIG. 2 represents coordinates in the Y axis direction, that is, in a direction normal to the substrate surface 50A. H represents a length of the waveguide 20 in the Y axis direction, that is, a height of the waveguide 20. W represents a length of the waveguide 20 in the X axis direction, that is, a width of the waveguide 20.

The intensity of electromagnetic waves corresponds to the magnitude of energy of the electric field component of electromagnetic waves. In the image of intensity distribution in FIG. 2, the closer the color of a pixel is to black (i.e., the darker the color), the higher the intensity of electromagnetic waves at a position corresponding to the pixel. Conversely, the closer the color of a pixel is to white (i.e., the lighter the color), the lower the intensity of electromagnetic waves at a position corresponding to the pixel.

FIG. 3 is a graph illustrating the intensity of TM mode electromagnetic waves at each point on a line passing through the center of the cross-section of the waveguide 20 in FIG. 2 and extending in the Y axis direction, that is, in the height direction of the waveguide 20. A horizontal axis of the graph in FIG. 3 represents coordinates in the Y axis direction, that is, coordinates in the height direction of the waveguide 20. A center of the waveguide 20 in the height direction corresponds to a point whose coordinate in the Y axis direction is 0. A vertical axis of the graph in FIG. 3 represents power, or intensity, of TM mode electromagnetic waves at each coordinate in the Y axis direction. In FIG. 3, H represents a range corresponding to the height of the waveguide 20. In the graph of FIG. 3, a position where the intensity of electromagnetic waves is a local minimum corresponds to the surface of the waveguide 20. Accordingly, in the graph of FIG. 3, the distance between two positions where the intensity of electromagnetic waves is a local minimum corresponds to the width (H) of the waveguide 20.

Outside the waveguide 20, the intensity of electromagnetic waves decreases with increasing distance from the surface of the waveguide 20. The intensity of TM mode electromagnetic waves outside the waveguide 20 decreases in accordance with a Gaussian distribution. As a propagation characteristic of TM mode electromagnetic waves in the waveguide 20, a mode field diameter (MFD) in the Y axis direction, which is the amplitude direction of the electrical field of TM mode electromagnetic waves, is defined. The mode field diameter in the Y axis direction is defined as a distance between two positions where the intensity of electromagnetic waves decreases to as low as $1/e2$ of the maximum intensity of electromagnetic waves propagating through the waveguide 20. In other words, the mode field diameter in the Y axis direction is defined as the length of a range where the intensity of electromagnetic waves is $1/e2$ or more of the maximum intensity. Note that "e" is a value representing the base of a natural logarithm, that is, a Napier's constant. In FIG. 3, MFD represents a range corresponding to the mode field diameter in the Y axis direction.

The energy of electromagnetic waves is effectively distributed in the range where the intensity of the electromagnetic waves is $1/e2$ or more of the maximum intensity. That is, the mode field diameter corresponds to the length of a range where the energy of electromagnetic waves is effectively distributed. The range of the mode field diameter corresponds to the range where the energy of electromagnetic waves is effectively distributed. The range of the mode field diameter in the Y axis direction corresponds to the range where the energy of electromagnetic waves propagating through the waveguide 20 is effectively distributed in the Y axis direction.

The mode field diameter in the Y axis direction is determined on the basis of the length of the waveguide 20 in the width direction (i.e., W) and the length of the waveguide 20 in the height direction (i.e., H) in a cross-section orthogonal to the direction in which the waveguide 20 extends. Also, the mode field diameter in the Y axis direction is determined on the basis of the refractive index of the waveguide 20, the refractive index of the BOX layer 52 and the insulating layer 54 surrounding the waveguide 20, and the wavelength of electromagnetic waves propagating through the waveguide 20.

The range where TM mode electromagnetic waves propagating through the waveguide 20 are effectively distributed in the Y axis direction is also referred to as the range of the mode field diameter of TM mode. When the non-reciprocal member 40 is in the range of the mode field diameter of TM mode, non-negligible non-reciprocity is exhibited in the waveguide 20 through which TM mode electromagnetic waves propagate. Conversely, when the non-reciprocal member 40 is not in the range of the mode field diameter of TM mode, non-reciprocity exhibited in the waveguide 20 through which TM mode electromagnetic waves propagate is zero or negligibly small. The non-reciprocity being zero means that non-reciprocity is not exhibited.

When non-reciprocity is to be exhibited in the waveguide 20 through which TM mode electromagnetic waves propagate, the optical integrated circuit 1 is configured such that at least part of the non-reciprocal member 40 is disposed within the range of the mode field diameter of TM mode in the waveguide 20. Specifically, the optical integrated circuit 1 may be configured such that a distance from a surface of the waveguide 20 remote from the substrate surface 50A (i.e., a distance from an upper surface of the waveguide 20) to the non-reciprocal member 40 is equal to or less than ½ of a value obtained by subtracting the height of the waveguide 20 from the mode field diameter of TM mode in the waveguide 20. With this configuration, effective distribution of the energy of TM mode electromagnetic waves propagating through the waveguide 20 reaches the non-reciprocal member 40. As a result, non-reciprocity is exhibited in the waveguide 20 through which TM mode electromagnetic waves propagate.

When non-reciprocity is not to be exhibited in the waveguide 20 through which TM mode electromagnetic waves propagate, or when non-reciprocity exhibited in the waveguide 20 is to be reduced to a negligible extent, the optical integrated circuit 1 is configured such that the non-reciprocal member 40 is not disposed within the range of the mode field diameter of TM mode in the waveguide 20. Specifically, the optical integrated circuit 1 may be configured such that the distance from the surface of the waveguide 20 remote from the substrate surface 50A (i.e., the distance from the upper surface of the waveguide 20) to the non-reciprocal member 40 is greater than ½ of the value obtained by subtracting the height of the waveguide 20 from the mode field diameter of TM mode in the waveguide 20. With this configuration, effective distribution of the energy of TM mode electromagnetic waves propagating through the waveguide 20 does not reach the non-reciprocal member 40. As a result, non-reciprocity is not exhibited in the waveguide 20 through which TM mode electromagnetic waves propagate.

In the present embodiment, the optical integrated circuit 1 is configured to allow non-reciprocity to be exhibited in the first waveguide 21. In this case, at least part of the first non-reciprocal member 41 disposed on a side of the first waveguide 21 remote from the substrate surface 50A is disposed within the range of the mode field diameter of TM mode in the first waveguide 21. In other words, the distance from the upper surface of the first waveguide 21 to the first non-reciprocal member 41, or D1, may be equal to or less than ½ of a value obtained by subtracting the height of the first waveguide 21, or H, from the mode field diameter of TM mode in the first waveguide 21.

The non-reciprocal member 40 includes the first non-reciprocal member 41. Accordingly, the non-reciprocal member 40 including the first non-reciprocal member 41 is disposed within the range of the mode field diameter of TM mode in the first waveguide 21.

In the present embodiment, the optical integrated circuit 1 is configured not to allow non-reciprocity to be exhibited in the second waveguide 22. In this case, the second non-reciprocal member 42 disposed on a side of the second waveguide 22 remote from the substrate surface 50A is not disposed within the range of the mode field diameter of TM mode in the second waveguide 22. In other words, the distance from the upper surface of the second waveguide 22 to the second non-reciprocal member 42, or D2, may be greater than ½ of the value obtained by subtracting the height of the second waveguide 22, or H, from the mode field diameter of TM mode in the second waveguide 22. In the graph of FIG. 3, TH1 represents the value that is ½ of the value obtained by subtracting the height of the second waveguide 22, or H, from the mode field diameter of TM mode in the second waveguide 22.

In order not to allow non-reciprocity to be exhibited in the second waveguide 22, the first non-reciprocal member 41 is disposed outside the range of the mode field diameter of TM mode in the second waveguide 22. Accordingly, the non-reciprocal member 40 including the first non-reciprocal member 41 and the second non-reciprocal member 42 is not disposed within the range of the mode field diameter of TM mode in the second waveguide 22.

As described above, when the first waveguide 21 in which non-reciprocity is exhibited and the second waveguide 22 in which non-reciprocity is not exhibited are both mounted in the optical integrated circuit 1, the distance between the non-reciprocal member 40 and the waveguide 20 is appropriately set. This allows non-reciprocity exhibited in each of the first waveguide 21 and the second waveguide 22 to be controlled as intended by design. As a result, the optical integrated circuit 1 can operate as intended by design.

Of the energy of TM mode electromagnetic waves propagating through the second waveguide 22, the energy reaching the second non-reciprocal member 42 may be further reduced to further reduce non-reciprocity of TM mode exhibited in the second waveguide 22.

For example, as a criterion for determining whether the energy of electromagnetic waves propagating through the waveguide 20 has been sufficiently attenuated outside the waveguide 20, attenuation of the energy to less than 1% of the maximum energy of electromagnetic waves propagating through the waveguide 20 may be applied. The attenuation of energy to 1% corresponds to 20 decibels (dB) and is commonly used in the field of optical fibers.

When the criterion described above is applied, the second non-reciprocal member 42 is not disposed in a range where, of energy of TM mode electromagnetic waves propagating through the second waveguide 22, energy leaking out of the second waveguide 22 is 1% or more of a maximum value of energy of electromagnetic waves in the second waveguide 22. In other words, the distance from the upper surface of the second waveguide 22 to the second non-reciprocal member 42, or D2, may be greater than ½ of a value obtained by subtracting the height of the second waveguide 22, or H, from the range where, of energy of TM mode electromagnetic waves propagating through the second waveguide 22, energy leaking out of the second waveguide 22 is 1% or more of a maximum value of energy of electromagnetic waves in the second waveguide 22. In the graph of FIG. 3, TH2 represents a value that is ½ of the value obtained by subtracting the height of the second waveguide 22, or H, from the range where, of energy of TM mode electromagnetic waves propagating through the second waveguide 22, energy leaking out of the second waveguide 22 is 1% or more of a maximum value of energy of electromagnetic waves in the second waveguide 22.

The first non-reciprocal member 41 is not disposed in the range where, of energy of TM mode electromagnetic waves propagating through the second waveguide 22, energy leaking out of the second waveguide 22 is 1% or more of a maximum value of energy of electromagnetic waves in the second waveguide 22. Accordingly, the non-reciprocal member 40 is not disposed in the range where, of energy of TM mode electromagnetic waves propagating through the second waveguide 22, energy leaking out of the second waveguide 22 is 1% or more of a maximum value of energy of electromagnetic waves in the second waveguide 22.

The value 1/e2 serving as a reference for the amount of attenuation to define the mode field diameter is about 13.5%, which is greater than 1%. Accordingly, the range of the mode field diameter is narrower than the range where, of energy of TM mode electromagnetic waves propagating through the second waveguide 22, energy leaking out of the second waveguide 22 is 1% or more of a maximum value of energy of electromagnetic waves in the second waveguide 22.

When the non-reciprocal member 40 is not disposed in the range where energy leaking out of the second waveguide 22 in which non-reciprocity is not exhibited is 1% or more of the maximum value, non-reciprocity exhibited in the second waveguide 22 is further reduced. This reduces the possibility that non-reciprocity not intended in the design of the optical integrated circuit 1 will be exhibited in the second waveguide 22. As a result, the optical integrated circuit 1 can operate as intended by the design.

(Application of Optical Integrated Circuit 1)

The optical integrated circuit 1 may include an element serving as an isolator. The isolator may include at least one non-reciprocal line. The isolator may include, as a non-reciprocal line, the first waveguide 21 in which non-reciprocity is exhibited. The isolator may include, as a reciprocal line, the second waveguide 22 in which non-reciprocity is not exhibited. The isolator may be used in combination with a component configured to transmit electromagnetic waves. The isolator may be applied to an optical switch, an optical transmitter and receiver, or a data center. The isolator may be applied, for example, to an electromagnetic wave transmitter. The electromagnetic wave transmitter includes an isolator and an optical source. In the electromagnetic wave transmitter, the isolator is configured to receive electromagnetic waves from the optical source, and output electromagnetic waves toward a receiver. The isolator is configured such that the transmittance of electromagnetic waves propagating from the optical source toward the receiver is greater than the transmittance of electromagnetic waves propagating from the receiver toward the optical source. This makes it difficult for electromagnetic waves to be incident on the optical source. As a result, the optical source can be protected.

The optical source may be a semiconductor laser, such as a laser diode (LD) or a vertical cavity surface emitting LASER (VCSEL). The optical source may include devices configured to emit not only visible light, but also electromagnetic waves of various wavelengths. The optical source may be disposed on the substrate 50 together with the isolator. The isolator may receive TE mode or TM mode electromagnetic waves from the optical source.

The electromagnetic wave transmitter may further include a modulator and a signal input unit. The modulator is configured to modulate electromagnetic waves by varying the intensity of the electromagnetic waves. The modulator may be disposed between the isolator and the receiver, not between the optical source and the isolator. For example, the modulator may be configured to pulse-modulate electromagnetic waves. The signal input unit is configured to receive signals from external devices and the like. The signal input unit may include, for example, a D/A converter. The signal input unit is configured to output signals to the modulator. The modulator is configured to modulate electromagnetic waves on the basis of a signal acquired by the signal input unit.

The optical source may include a modulator and a signal input unit. In this case, the optical source may be configured to output modulated electromagnetic waves, which are received by the isolator.

The electromagnetic wave transmitter may be mounted on the substrate 50. The optical source may be mounted to connect to a branching unit, with the modulator therebetween. The branching unit is configured to branch electromagnetic waves to at least one non-reciprocal line. The optical source may be mounted to connect to the branching unit, without the modulator therebetween. The receiver may be mounted to connect to a multiplexing unit, without the modulator therebetween. The multiplexing unit is configured to multiplex electromagnetic waves received from at least one non-reciprocal line. The receiver may be mounted to connect to the multiplexing unit, with the modulator therebetween. In this case, the modulator may be mounted to connect to the multiplexing unit.

The optical integrated circuit 1 may be formed by a silicon photonics technique.

Although the embodiments of the present disclosure have been described on the basis of the drawings and examples, it is to be noted that a person skilled in the art can make various changes or alterations on the basis of the present disclosure. Accordingly, it is to be noted that these changes or alterations are included in the scope of the present disclosure. For example, functions included in each component can be rearranged such that they are not logically inconsistent, and a plurality of components can be combined into one or can be divided.

In the present disclosure, the terms, such as "first" and "second", are identifiers for identifying the components. Numbers for the components identified by the terms, such as "first" and "second", in the present disclosure are interchangeable. For example, the identifiers "first" and "second" for the first waveguide 21 and the second waveguide 22 are interchangeable. The interchange of identifiers takes place at the same time. The components are identified even after interchange of identifiers. Identifiers may be removed. Components with identifiers removed are identified by reference numerals. The order of components is not to be interpreted, or the existence of an identifier with a smaller number is not to be determined, on the basis only of the identifiers, such as "first" and "second", in the present disclosure.

In the present disclosure, the X axis, the Y axis, and the Z axis are provided for convenience of explanation and may be interchanged with one another. In the present disclosure, the components have been described by using an orthogonal coordinate system defined by the X axis, the Y axis, and the Z axis. In the present disclosure, the positional relationships between components are not necessarily orthogonal.

The invention claimed is:

1. An optical integrated circuit comprising:
a substrate comprising a substrate surface;
a first waveguide and a second waveguide configured to allow electromagnetic waves to propagate along the substrate surface; and
a non-reciprocal member disposed on a side of the first waveguide and the second waveguide remote from the substrate surface,
wherein at least part of the non-reciprocal member is disposed in a range of a mode field diameter of TM mode electromagnetic waves in the first waveguide; and
the non-reciprocal member is not disposed in a range of a mode field diameter of TM mode electromagnetic waves in the second waveguide.

2. The optical integrated circuit according to claim 1, wherein the non-reciprocal member is not disposed in a range where, of energy of TM mode electromagnetic waves propagating through the second waveguide, energy leaking out of the second waveguide is 1% or more of a maximum value of energy of electromagnetic waves in the second waveguide.

* * * * *